United States Patent [19]

Abdella

[11] Patent Number: 6,044,258
[45] Date of Patent: Mar. 28, 2000

[54] SYSTEM AND METHOD FOR UPDATING A TIME REMAINING VALUE

[75] Inventor: Richard Michael Abdella, Raleigh, N.C.

[73] Assignee: Ericsson Inc., Research Triangle Park, N.C.

[21] Appl. No.: 08/997,276

[22] Filed: Dec. 23, 1997

[51] Int. Cl.⁷ .................................................. H04M 15/00
[52] U.S. Cl. .......................... 455/405; 455/406; 455/407; 455/408; 455/409
[58] Field of Search .................................... 455/406, 407, 455/408, 409, 405; 379/144

[56] References Cited

U.S. PATENT DOCUMENTS

| | | | |
|---|---|---|---|
| 5,138,650 | 8/1992 | Stahl et al. ................................ | 455/408 |
| 5,577,100 | 11/1996 | McGregor et al. ...................... | 455/418 |
| 5,631,947 | 5/1997 | Wittstein et al. ........................ | 455/409 |
| 5,826,185 | 10/1998 | Wise et al. ............................... | 455/405 |

FOREIGN PATENT DOCUMENTS

| | | |
|---|---|---|
| 0135196 | 3/1985 | European Pat. Off. . |
| 0647055 | 4/1995 | European Pat. Off. . |
| 0746135 | 12/1996 | European Pat. Off. . |
| 2265522 | 9/1993 | United Kingdom . |
| 9834393 | 8/1998 | WIPO . |

*Primary Examiner*—William G. Trost
*Assistant Examiner*—Raymond B. Persino
*Attorney, Agent, or Firm*—Wood, Phillips, VanSanten, Clark & Mortimer

[57] ABSTRACT

A method is provided for updating a time-remaining value representative of the time remaining during a predetermined period of time for communication between a mobile communications device and a radio telecommunications network, the mobile communications device having a memory site in which the time-remaining value may be stored. The method has the step of communicating an update request signal from the mobile communications device to the radio telecommunications network. The method also has the step of communicating an initialization value representative of the time remaining within the predetermined period of time for communication between the mobile communications device and the radio telecommunications network from the radio telecommunications network to the mobile communications device in response to the update request signal. The method has the further step of storing the initialization value in the memory site. Also provided are a system for a carrying out the method of updating a time-remaining value, including a mobile communications device and a radio telecommunications network.

12 Claims, 2 Drawing Sheets

SYSTEM AND METHOD FOR UPDATING A TIME REMAINING VALUE

FIELD OF THE INVENTION

The present invention is directed to a system and a method for transmitting and receiving information relating to the time remaining within a predetermined period of time for communication between a mobile communications device and a radio telecommunications network, and in particular to a system and a method for transmitting and receiving information relating to the time remaining for communication wherein the radio telecommunications network communicates a value representative of the time remaining within the predetermined period of time to the mobile communications device.

BACKGROUND OF THE INVENTION

It is known in the art to provide a mobile or cellular phone with a program which allows the cellular phone user to keep track of the free time remaining on their service plan within a predetermined period of time (a month, for example). Conventionally, the program requires the cellular phone user to input a value at the beginning of each month representative of the total monthly free time allotted under the service plan for communication between the cellular phone and a radio telecommunications network. The program keeps a record of the calls made by the cellular phone user within the month, and adjusts the total monthly free time value so as to generate a free time remaining value representative of the free time remaining under the service plan for the month.

The usefulness of such programs is dependent, however, upon the cellular phone user faithfully inputting the correct total monthly free time value each month. If the user inputs an incorrect total monthly free time value, then the program will provide an inaccurate estimate of the free time remaining. If the user forgets to input the total monthly free time value at the beginning of the month (or such other time as the service plan may provide for), then the user must input an estimate of the total free time remaining, or ignore the program altogether. The degree of uncertainty inherent in the user's approximation is, of course, carried over as an uncertainty in the calculated free time remaining value.

SUMMARY OF THE INVENTION

According to an aspect of the present invention, a method is provided for updating a time-remaining value representative of the time remaining during a predetermined period of time for communication between a mobile communications device and a radio telecommunications network, the mobile communications device having a first memory site in which the time-remaining value may be stored. The method has the step of communicating an update request signal from the mobile communications device to the radio telecommunications network. The method also has the step of communicating an initialization value representative of the time remaining within the predetermined period of time for communication between the mobile communications device and the radio telecommunications network from the radio telecommunications network to the mobile communications device in response to the update request signal. The method has the further step of storing the initialization value in the first memory site.

Moreover, the request signal may be a registration signal, and the step of communicating an initialization value may include the step of determining if another update request signal was communicated to the radio telecommunications network before the update request signal was communicated to the radio telecommunications network. The step of communicating an initialization value may also include the step of communicating the initialization value to the mobile communications device if no other update request signal was communicated to the radio telecommunications network before the update request signal was communicated to the radio telecommunications network.

The mobile communications device may also have a second memory site in which information relating to the time-remaining value other than the initialization value may be stored. If so, then the method may further include the step of communicating account time information other than the initialization value relating to the time remaining within the predetermined period of time for communication between the mobile communications device and the radio telecommunication network from the radio telecommunications network to the mobile communications device in response to the update request signal. The method may include storing the account time information in the memory site. Moreover, the account time information other than the initialization value may be a decrement rate.

According to another aspect of the invention, a radio telecommunications network has a transmitter/receiver to communicate with a mobile communications device. The radio telecommunications network also has a memory selectively coupleable to the transmitter/receiver and having a site in which is stored an initialization value representative of the time remaining during a predetermined period of time for communication between the radio telecommunications network and a mobile communications device. The network further has a programmable computational apparatus selectively coupleable to the transmitter/receiver and the memory, and a program operating in the programmable computational apparatus to control the programmable computational apparatus to retrieve the initialization value from the memory in response to an update request signal from a mobile communications device and to cause the initialization value to be transmitted to a mobile communications device.

Moreover, the update request signal may be a registration signal, and the memory may have a site in which is stored information concerning registration signals received from a mobile communications device. The program operating in the programmable computational apparatus may control the programmable computational apparatus to determine if another update request signal was communicated to the radio telecommunications network by the mobile communications device before the update request signal was communicated to the radio telecommunications network, and to communicate the initialization value to the mobile communications device if no other update request signal was communicated to the radio telecommunications network before the update request signal was communicated to the radio telecommunications network by the mobile communications device.

Moreover, the memory may have a site in which is stored account time information relating to the time-remaining value other than the initialization value. The program operating the programmable computational apparatus may control the programmable computational apparatus to retrieve the account time information relating to the time-remaining value other than the initialization value in response to an update request signal from a mobile communications device and to cause the account time information relating to the time-remaining value other than the initialization value to be transmitted to a mobile communications device. The account time information other than the initialization value may be a decrement rate.

According to a further aspect of the invention, a mobile communications device has a transmitter/receiver to communicate with a radio telecommunications network. The mobile communications device also has a memory selectively coupleable to the transmitter/receiver and having a site to store a time-remaining value representative of the time remaining during a predetermined period of time for communication between the mobile communications device and a radio telecommunications network. The mobile communications device further has a programmable computational apparatus selectively coupleable to the transmitter/receiver and the memory, and a program operating in the programmable computational apparatus to control the programmable computational apparatus to cause an update request signal to be transmitted to a radio telecommunications network, and to store an initialization value representative of the time remaining during a predetermined period of time for communication between the mobile communications device and a radio telecommunications network received by the transmitter/receiver in the memory site for the time-remaining value.

Moreover, the memory may have a site to store account time information relating to the time-remaining value other than a time-remaining value representative of the time remaining during a predetermined period of time for communication between the mobile communications device and a radio telecommunications network. The program operating the programmable computational apparatus may control the programmable computational apparatus to cause an update request signal to be transmitted to a radio telecommunications network, and to store account time information relating to the time-remaining value received by the transmitter/receiver in the memory site for the account time information relating to the time-remaining value. The account time information other than the initialization value may be a decrement rate.

According to a still further aspect of the invention, a radio telecommunications system is provided. The radio telecommunications system has a radio telecommunications network having a network transmitter/receiver, a network memory selectively coupleable to the network transmitter/receiver and having a site in which is stored an initialization value, a network programmable computational apparatus selectively coupleable to the network transmitter/receiver and the network memory, and a network program operating in the network programmable computational apparatus. The radio telecommunications system also has a mobile communications device having a mobile device transmitter/receiver to communicate with the network transmitter/receiver, a mobile device memory selectively coupleable to the mobile device transmitter/receiver and having a site to store a time-remaining value representative of the time remaining during a predetermined period of time for communication between the mobile communications device and the radio telecommunications network, a mobile device programmable computational apparatus selectively coupleable to the mobile device transmitter/receiver and the mobile device memory, and a mobile device program operating in the mobile device programmable computational device.

In such a radio telecommunications system, the mobile device program operates in the mobile device programmable computational apparatus to control the mobile device programmable computational apparatus to cause an update request signal to be transmitted to the radio telecommunications network. In response to the update request signal from the mobile communications device, the network program operates in the network programmable computational apparatus to control the network programmable computational apparatus to retrieve the initialization value from the network memory and to cause the initialization value to be transmitted to the mobile communications device. In turn, the mobile device program operates in the mobile device programmable computational apparatus to control the mobile device programmable computational apparatus to store the initialization value in the mobile device memory site for the time-remaining value.

DETAILED DESCRIPTION OF THE PREFERRED EMBODIMENT

Figure 1:
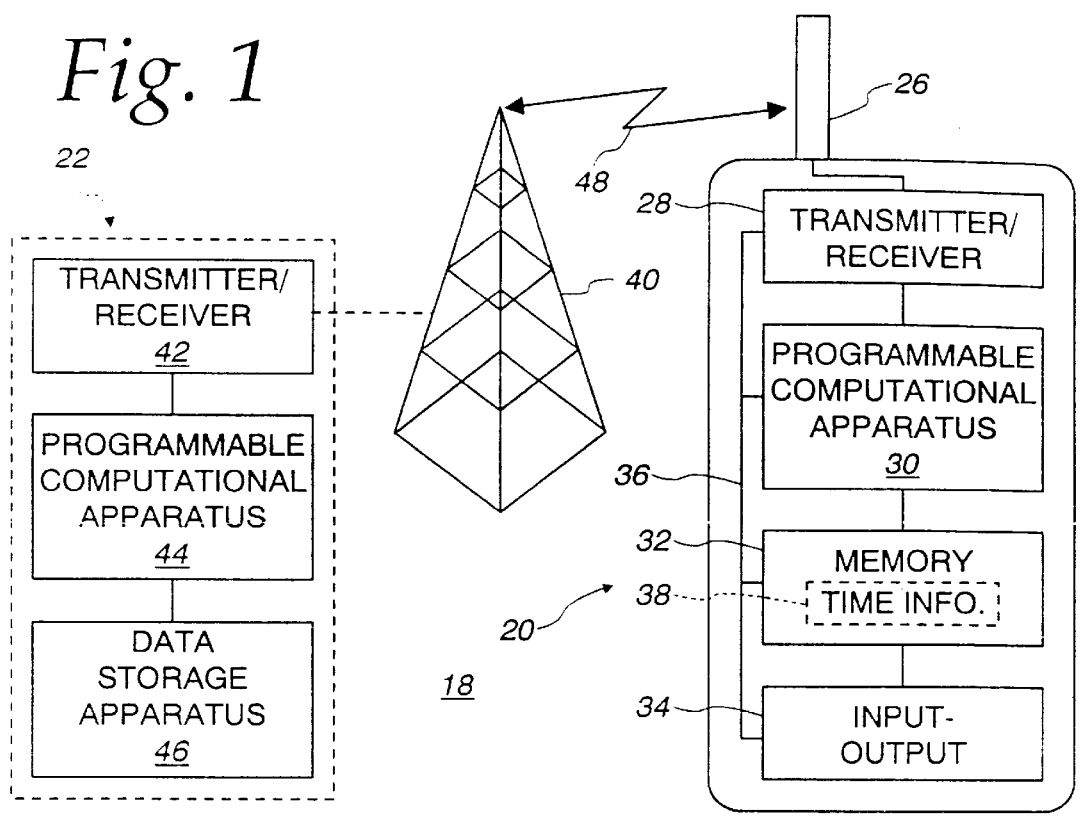
FIG. 1 is a somewhat schematic diagram of a radio telecommunications system including a mobile communications device and a radio telecommunications network in communication with the mobile communications device.

FIG. 1 shows a radio telecommunications system 18 including a mobile station or mobile communications device 20 in radio telecommunication with a radio telecommunications network 22. The mobile communications device 20 and the radio telecommunications network 22 practice a method of updating a time remaining value in the mobile communications device 20 according to the present invention.

According to the method, the radio telecommunications network 22 responds to various signals from the mobile communications device 20 by providing account time information relating to the free time remaining for communication between the mobile communications device 20 and the radio telecommunications network 22. The mobile communications device 20 may provide a signal which is recognized automatically by the network 22 as a request for updating the time remaining value. For example, the update request signal may be the first registration signal received by the radio telecommunications network 22 in a predetermined period of time, i.e., the first registration signal received by the network 22 in a week or month. Alternatively, the mobile communications device 20 may provide an update request signal at such times during the predetermined period of time as the user requires an update. In response to the update request signal, the radio telecommunications network 22 transmits an initialization value which is representative of the free time remaining for communication between the mobile communications device 20 and the radio telecommunications network 22. The radio telecommunications network 22 may also transmit other information relating to the time remaining value, such as at a decrement rate at which the initialization value should be reduced.

The system 18 is now described in greater detail with reference to FIG. 1. The mobile communications device has an antenna 26, a transmitter/receiver 28, a programmable computational apparatus 30, a permanent (non-volatile) memory 32, an input/output assembly 34, and a data bus 36. The antenna 26 and the transmitter/receiver 28 allow the mobile communications device 20 to send and receive messages from the radio telecommunications network 22, i.e. to communicate with the radio telecommunications network 22. Messages are transferred between the transmitter/receiver 28, the programmable computational device 30, the memory 32 and the input/output device 34 along the data bus 36 as is known. The permanent memory 32 has a site 38 therein wherein account time information relating to the free time remaining for communication between the mobile communications device 20 and the radio telecommunications network 22 may be stored. Messages and information, such as the account time information relating to free time remaining, may be displayed by the input/output assembly 34, for example, visually in numeric or alphanumeric form or audibly.

The radio telecommunications network 22 also has an antenna 40. In addition, the radio telecommunications network 22 conventionally has a transmitter/receiver 42, a programmable computational device 44 and a data storage apparatus 46 wherein the free time remaining information, periodically updated by the programmable computational device 44, is conventionally stored. While the transmitter/receiver 42 is shown connected to the programmable computational device 44, which in turn is connected to the data storage apparatus 46, the transmitter/receiver 42, the programmable computational apparatus 44 and the data storage apparatus 46 could be connected to a common data bus similar to that shown in the mobile communications device 20 for the transfer of data between the programmable computational device 44, the memory 46 and the transmitter/receiver 42.

Communication between the mobile communications device 20 and the radio telecommunications network 22 is shown by a double-headed arrow 48. The radio telecommunications network 22 can transmit messages which the mobile communications device 20 receives. Similarly, the mobile communications device 20 can transmit messages which the radio telecommunications network 22 receives.

Figure 2:
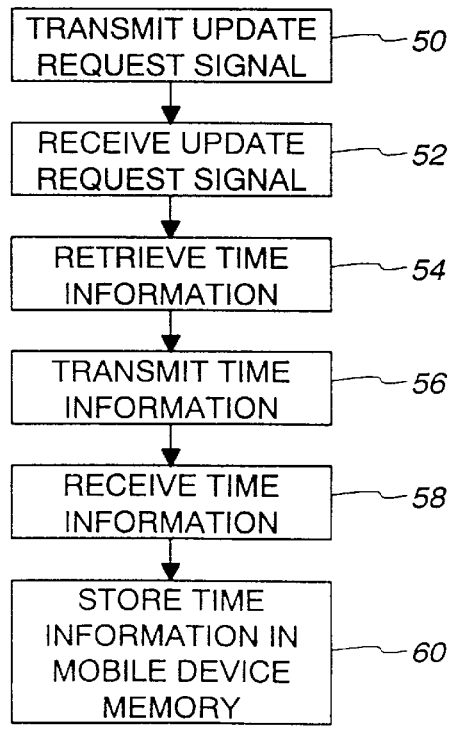
FIG. 2 is a block diagram of a method according to the present invention of updating a time remaining value.

FIG. 2 shows the system-wide operation of the method according to the present invention in the system 18. The method begins at block 50 with the mobile communications device 20 transmitting an update request signal to the radio telecommunications network 22. As mentioned previously, the update request signal may be the first registration signal communicated between the mobile communications device 20 and the radio telecommunications network 22 within a predetermined period of time. Alternatively, the update request signal may be a separate signal provided automatically at the beginning of the predetermined period of time. As a still further alternative, the update request signal may be selectively transmitted at the discretion of the user of the mobile communications device 20 at any time during the predetermined period of time.

At block 52, the radio telecommunications network 22 receives the update request signal which the mobile communications device 20 has transmitted. In response, at block 54, the programmable computational apparatus 44 accesses the data storage apparatus 46 and retrieves the account time information for the specific mobile communications device 20 providing the update request signal. At block 56, the radio telecommunications network 22 transmits the account time information, in particular an initialization value representative of the free time allotted under the service plan for the time remaining within the predetermined period of time and, for example, a decrement rate to be used by the mobile communications device 20 to decrement the initialization value to generate a time remaining value. The message may be contained in a conventional over-the-air programming teleservice (OPTS) message, but the method and system described herein are not limited to OPTS messages.

At block 58, the mobile communications device 20 receives the account time information transmitted by the radio telecommunications network 22 at block 56. The account time information is stored at block 60 in the memory 32 of the mobile communications device 20, and in particular in the storage site 38. The account time information stored in the storage site 38 may also be displayed, for example visually in numeric or alphanumeric form, by the input/output assembly 34 at the time it is stored, or in response to a user request to access the account time information stored in the storage site 38.

Figure 3:
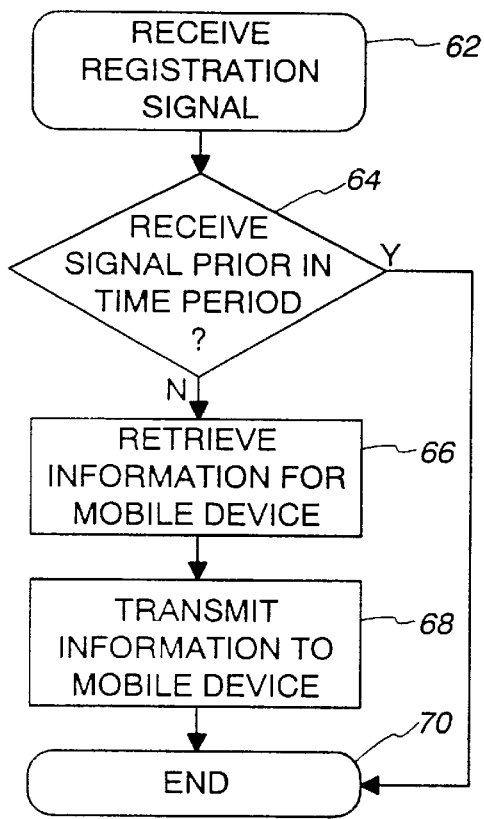
FIG. 3 is a block diagram of a program according to the present invention for use in the radio telecommunications network for updating a time remaining value at the beginning of a predetermined period of time.

A first program operating in the programmable computational apparatus 44 of the radio telecommunications network 22 to operate the programmable computational apparatus 44 according to the method of the present invention is illustrated in FIG. 3. This program uses a registration signal transmitted by the mobile communications device 20 to prompt the radio telecommunications network 22 to retrieve and transmit the account time information to the mobile communications device 20.

According to this program, at block 62, a registration signal is received by the radio telecommunications network 22. In response to the registration signal, the program operates the programmable computational apparatus 44 to access the data storage apparatus 46 for the account information corresponding to the mobile communications device 20 providing the registration signal at block 64. Also at block 64, the program operates the programmable computational apparatus 44 to determine, based on the account information accessed for the mobile communications device 20, whether the mobile communications device 20 has transmitted another registration signal within a predetermined period of time which is under consideration (for example, a month).

If the mobile communications device 20 had not yet communicated a registration signal to the radio telecommunications network 22 during the predetermined period of time, then at block 66 the program operates the programmable computational apparatus 44 to retrieve from the data storage apparatus 46 the account time information for the mobile communications device 20. This information includes an initialization value which is representative of the total monthly free time allotted under the service plan to the user of the mobile communications device 20 and, for example, a decrement rate. This account time information is then transmitted to the mobile communications device 20 via the transmitter/receiver 42 and the antenna 40 at block 68. The program ends at block 70.

If, on the other hand, the program operates the programmable computational device 44 to determine at block 64 that the mobile communications device 20 has already transmitted a registration signal to the radio telecommunications network 22 within the predetermined period of time, then the program does not access the account time information for the user's account. Instead, the program ends at block 70.

Figure 4:
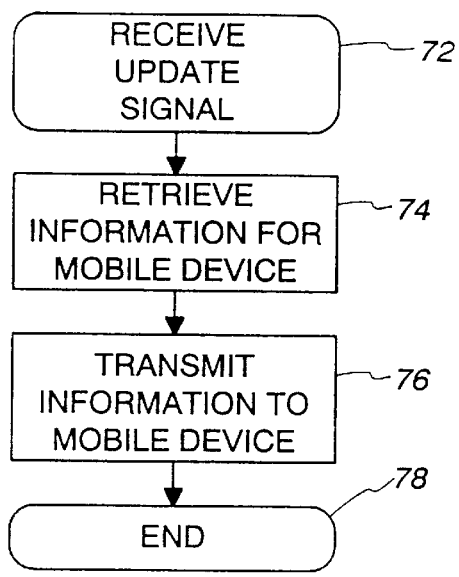
FIG. 4 is a block diagram of a program according to the present invention for use in the radio telecommunications network for updating a time remaining value in response to an update request signal from the mobile communications device.

A second program operating in the programmable computational apparatus 44 of the radio telecommunications network 22 to operate the programmable computational apparatus 44 according to the method of the present invention is illustrated in FIG. 4. According to this program, the transmittal of the information regarding the user's account, in particular the amount of free time remaining allotted to the user's account during a predetermined period of time, is prompted by a user activated update request signal.

At block 72, an update request signal is received by the radio telecommunications network 22. In response, the program operates the programmable computational apparatus 44 to retrieve from the data storage apparatus 46 the account time information for the mobile communications device 20 at block 74. This information includes an initialization value which is representative of the free time remaining allotted under the service plan to the user of the mobile communications device 20 within the predetermined period of time and may include, for example, a decrement rate. If the update request signal is received at the beginning of the month, then the initialization value will be equal to the total monthly free time allotted under the user's service agreement with the service provider. If the update request signal is received at some other time during the month, the initialization value will be representative of the total monthly free time allotted under the service plan less the free time already used by the user of the mobile communications device 20. The program operates the programmable computational device 44 to transmit the account time information to the mobile communications device 20 at block 76, and the program ends a block 78.

Figure 5:
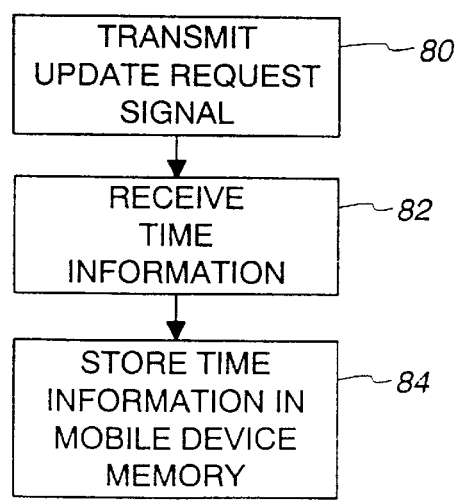
FIG. 5 is a block diagram of a program according to the present invention for use in the mobile communications device for updating a time remaining value.

FIG. 5 illustrates a program for use in the mobile communications device to retrieve account time information. At block 80, the program operates the programmable computational device 30 to generate an update request signal which is transmitted to the radio telecommunications network 22 via the antenna 26 and the transmitter/receiver 28. The request update signal may take the form of the first registration signal transmitted to the radio telecommunications network 22 within a predetermined period of time. Alternatively, the update request signal may be a separate update request signal selected at the user's option as mentioned previously.

At block 82, the program operates the mobile communications device 20 to receive a transmission from the radio telecommunications network 22 including an initialization value and, for example, a decrement rate. At block 84, the program operates the programmable computational device 30 to transfer the initialization value and decrement rate from the transmitter/receiver 28 to the memory 32, to be stored therein in the storage site 38.

Still other aspects, objects, and advantages of the present invention can be obtained from a study of the specification, the drawings, and the appended claims.

I claim:

1. A method of updating a time-remaining value representative of the time remaining during a predetermined period of time for communication between a mobile communications device and a radio telecommunications network, the mobile communications device having a first memory site in which the time-remaining value may be stored, the method comprising the steps of:

communicating a current update request signal from the mobile communications device to the radio telecommunications network;

determining if another update request signal was communicated to the radio telecommunications network during the predetermined period of time before the current update request signal was communicated to the radio telecommunications network;

communicating an initialization value representative of the time remaining within the predetermined period of time from the radio telecommunications network to the mobile communications device in response to the update request signal if no other update request signal was communicated to the radio telecommunications network during the predetermined period of time before the current update request signal was communicated to the radio telecommunications network; and storing the initialization value in the first memory site.

2. The method according to claim 1, wherein the mobile communications device has a second memory site in which information relating to the time-remaining value other than the initialization value may be stored, and the method further comprises the step of communicating account time information other than the initialization value relating to the time remaining within the predetermined period of time for communication between the mobile communications device and the radio telecommunication network from the radio telecommunications network to the mobile communications device in response to the update request signal; and storing the account time information in the second memory site.

3. The method according to claim 2, wherein the account time information other than the initialization value is a decrement rate.

4. The method according to claim 1, wherein the update request signals are registration signals.

5. The method according to claim 1, wherein the predetermined period of time has a beginning and an end, and said determining step determines if another update request signal was communicated to the radio telecommunications network after the beginning of the predetermined period of time and before the current update request signal was communicated to the radio telecommunications network.

6. In a radio telecommunications system comprising a radio telecommunications network in communication with a mobile communications device, the radio telecommunications network comprising:

a transmitter/receiver to communicate with a mobile communications device;

a memory selectively coupleable to the transmitter/receiver and having a site in which is stored
an initialization value representative of the time remaining during a predetermined period of time for communication between the radio telecommunications network and a mobile communications device, and
information concerning update request signals received from a mobile communications device;

a programmable computational apparatus selectively coupleable to the transmitter/receiver and the memory; and a program operating in the programmable computational apparatus to control the programmable computational apparatus to
determine if another update request signal was communicated to the radio telecommunications network by the mobile communications device before the update request signal was communicated to the radio telecommunications network and, if no other update request signal was communicated to the radio telecommunications network before the update request signal was communicated to the radio telecommunications network by the mobile communications device, to
retrieve the initialization value from the memory in response to an update request signal from a mobile communications device and to cause the initialization value to be transmitted to a mobile communications device, and
communicate the initialization value to the mobile communications device.

7. The radio telecommunications network according to claim 6, wherein:

the memory has a site in which is stored account time information relating to the time-remaining value other than the initialization value; and the program operating the programmable computational apparatus controls the programmable computational apparatus to retrieve the account time information relating to the time-remaining value other than the initialization value in response to an update request signal from a mobile communications device and to cause the account time information relating to the time-remaining value other than the initialization value to be transmitted to a mobile communications device.

8. The radio telecommunications network according to claim 7, wherein the account time information other than the initialization value is a decrement rate.

9. In a radio telecommunications system comprising a radio telecommunications network in communication with a mobile communications device, the mobile communications device comprising:

a transmitter/receiver to communicate with a radio telecommunications network and adapted to receive an initialization value responsive to initial communication with the radio telecommunications network during a predetermined time period, said initialization value representative of the time remaining during the predetermined period of time for communication between the mobile communications device and a radio telecommunications network;

a user selectable override for requesting an updated initialization value from the radio telecommunications network at any time during the predetermined time period;

a memory selectively coupleable to the transmitter/receiver and having a site to store a time-remaining value representative of the time remaining during the predetermined period of time for communication between the mobile communications device and a radio telecommunications network, said memory replacing said stored time-remaining value with any received initialization value when received;

a programmable computational apparatus selectively coupleable to the transmitter/receiver and the memory; and a program operating in the programmable computational apparatus to control the programmable computational apparatus to cause an update request signal to be transmitted to a radio telecommunications network, and to store the initialization value in the memory site for the time-remaining value.

10. The mobile communications device according to claim 9, wherein:

the memory has a site to store account time information relating to the time-remaining value other than a time-remaining value representative of the time remaining during a predetermined period of time for communication between the mobile communications device and a radio telecommunications network; and the program operating the programmable computational apparatus controls the programmable computational apparatus to cause an update request signal to be transmitted to a radio telecommunications network, and to store account time information relating to the time-remaining value received by the transmitter/receiver in the memory site for the account time information relating to the time-remaining value.

11. The mobile communications device according to claim 10, wherein the account time information other than the initialization value is a decrement rate.

12. A radio telecommunications system comprising:

a radio telecommunications network having a network transmitter/receiver, a network memory selectively coupleable to the network transmitter/receiver and having a site in which is stored an initialization value; a network programmable computational apparatus selectively coupleable to the network transmitter/receiver and the network memory, and a network program operating in the network programmable computational apparatus; and a mobile communications device having a mobile device transmitter/receiver to communicate with the network transmitter/receiver, a mobile device memory selectively coupleable to the mobile device transmitter/receiver and having a site to store a time-remaining value representative of the time remaining during a predetermined period of time for communication between the mobile communications device and the radio telecommunications network, a mobile device programmable computational apparatus selectively coupleable to the mobile device transmitter/receiver and the mobile device memory, and a mobile device program operating in the mobile device programmable computational device;

wherein the mobile device program operates in the mobile device programmable computational apparatus to control the mobile device programmable computational apparatus to cause a current update request signal to be transmitted to the radio telecommunications network;

wherein the network program operates in the network programmable computational apparatus to control the network programmable computational apparatus to determine if another update request signal was communicated to the radio telecommunications network during the predetermined period of time before the current update request signal was communicated to the radio telecommunications network, and if no other update request signal is determined to have been communicated to the radio telecommunications network before the update request signal was communicated to the radio telecommunications network by the mobile communications device, retrieve the initialization value from the network memory in response to the current update request signal, and cause the initialization value to be transmitted to the mobile communications device; and wherein the mobile device program operates in the mobile device programmable computational apparatus to control the mobile device programmable computational apparatus to store the transmitted initialization value in the mobile device memory site for the time-remaining value.

* * * * *